J. D. JACKSON.
COMBINED AIR COMPRESSOR AND SHOCK ABSORBER.
APPLICATION FILED DEC. 23, 1911.
1,038,374.  Patented Sept. 10, 1912.
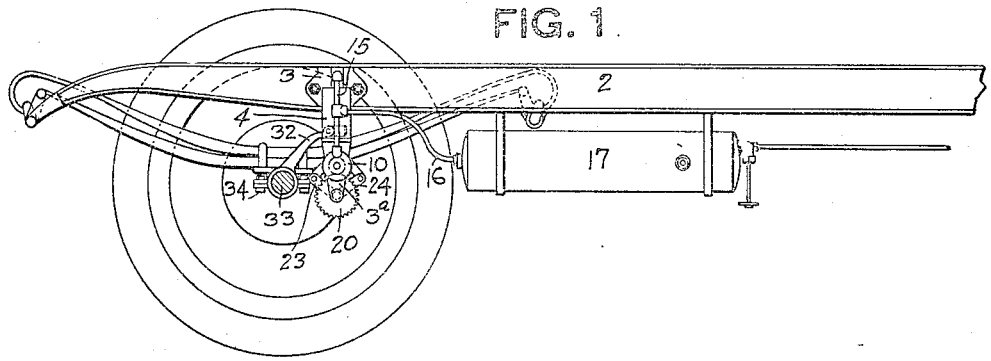
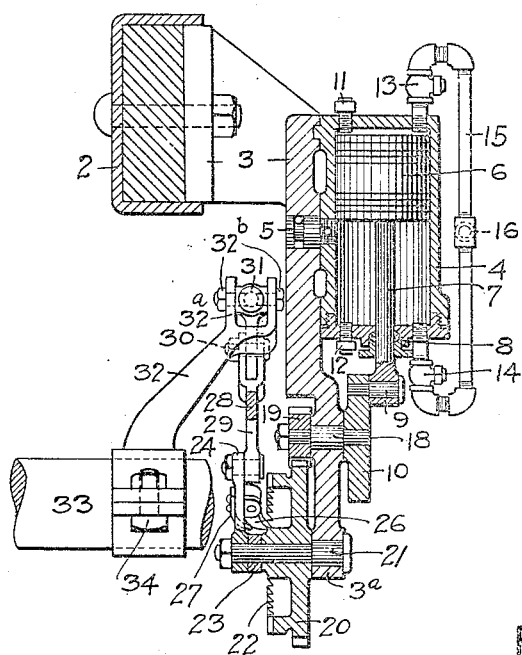
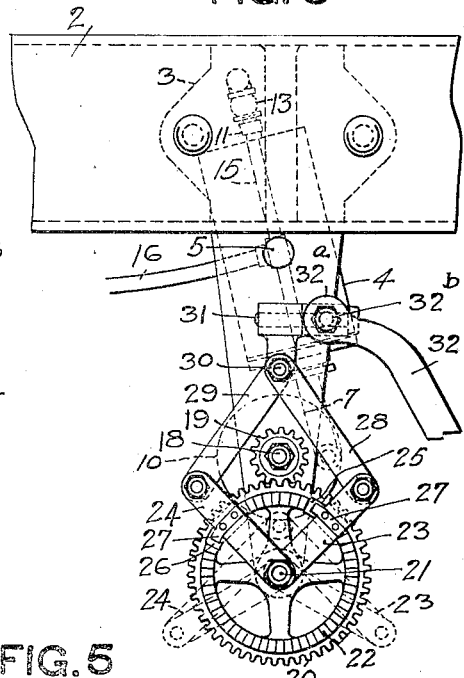
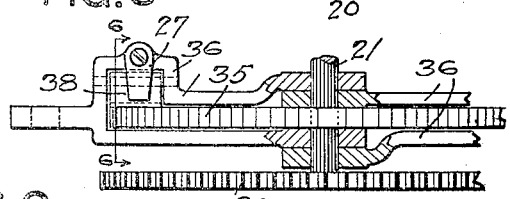
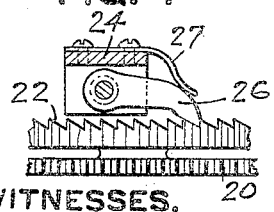
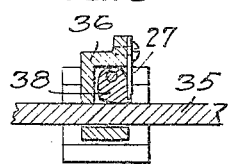
WITNESSES.
J. K. Keller
Robt. C. Totten
INVENTOR.
Joseph D. Jackson
By Kay & Totten
attorneys

UNITED STATES PATENT OFFICE.

JOSEPH D. JACKSON, OF WASHINGTON, PENNSYLVANIA.

COMBINED AIR-COMPRESSOR AND SHOCK-ABSORBER.

1,038,374.  Specification of Letters Patent.  Patented Sept. 10, 1912.

Application filed December 23, 1911. Serial No. 667,519.

*To all whom it may concern:*

Be it known that I, JOSEPH D. JACKSON, a citizen of the United States, and resident of Washington, in the county of Washington and State of Pennsylvania, have invented a new and useful Improvement in Combined Air-Compressors and Shock-Absorbers; and I do hereby declare the following to be a full, clear, and exact description thereof.

My invention relates to a shock absorber and air compressor.

The object of my invention is to provide a means for automatically producing and storing a sufficient quantity of fresh air, for the purpose of inflating tires, operating pneumatic motor starter, or other uses to which compressed air may be found desirable in connection with the operations of an automobile or its accessories. Said compressed air being obtained by the hereinafter described means of using the spring vibrations of the moving vehicle. The natural resistance caused by said compression will in turn produce a proficient shock restrainer.

To these ends my invention comprises, generally stated, a cylinder attached to the vehicle body, a piston, a piston rod, the crank to which the piston rod is connected, and means operated by the jolting of the vehicle for moving said piston, said piston always acting to complete the stroke of the piston before said piston reverses, whereby the air is compressed to the full extent before the piston reverses, and said air is conducted to a suitable storage tank to be used when desired.

Referring to the accompanying drawing Figure 1 is a side view of a portion of the chassis of the vehicle with my invention applied thereto; Fig. 2 is an enlarged vertical sectional view; Fig. 3 is an enlarged face view of the gear mechanism; Fig. 4 is an enlarged detail of the pawl and gear mechanism; and Figs. 5 and 6 show a modified form of my invention.

In the drawing the numeral 2 designates the side frame of a suitable chassis or running gear of an automobile or other vehicle. A suitable bracket 3 is bolted or otherwise secured to the frame 2. A cylinder 4 is mounted to swing on the bracket 3 by means of the pivot 5. Within the cylinder 4 is the piston 6 to which the piston rod 7 is connected. The piston rod 7 passes out through a suitable stuffing box 8 and said piston rod is connected to the wrist pin 9 on the crank disk 10.

The heads of the cylinder 4 are provided with the air intakes 11 and 12 provided with suitable check valves. The outlets 13 and 14 are also provided with check valves and said outlets are connected up with the pipe 15 which is connected to the pipe 16 leading to the tank 17. This pipe 16 is flexible, allowing for the swinging of the cylinder 4.

The crank disk 10 is mounted on the shaft 18 which is journaled in bearings in the depending portion 3ª of the bracket and in the opposite end of said shaft is the pinion 19 which meshes with the gear wheel 20 on the shaft 21. This gear wheel 20 has the ratchet 22 connected thereto or forming part thereof. Arms 23 and 24 are mounted on the shaft 21 and said arms carry pawls 25 and 26 which engage the teeth of the ratchet 22. These pawls are spring actuated by the springs 27 and are always held in engagement by the ratchet 22. The pawls 25 and 26 are reversed so that when one is turning the ratchet 22 and gear wheel 20 in one direction, the other is slipping over the teeth of the ratchet.

Lever arms 28 and 29 are connected to the arms 23 and 24, respectively, said lever arms being pivotally connected by the pin 30, and one of said lever arms 29 is connected to the bolt 31 in the bracket arm 32. This bracket arm 32 is carried by the axle 33 being secured thereto by the clamping bolts 34. Through the bifurcated end 32ª of the bracket 32 extend the screws 32ᵇ which are concaved at their inner ends to partly embrace the bolt 31, as shown in dotted lines Fig. 2. This construction permits the lever-arms to swing on the bolt 31 as well as on the screws 32ᵇ, thus giving a universal movement.

When my improved shock absorber and air compressor is in use and the vehicle in running encounters rough spots or depressions in the roadway, the chassis will be moved up and down a distance in proportion to the depression or unevenness, and at the same time the axle 33 will also move up and down, but whichever way the movement is, or whether it is a short quick jolt or a long one, the piston 6 will always complete its stroke before it reverses, or in other words, the crank disk 10 will always rotate in the same direction. This is due to the movement of the arms 23 and 24 which will always rotate the gear wheel 20 in the same direction whether said arms move up or down, as the pawl on one arm will be moved over the teeth of the ratchet 22 while the teeth of the other pawl are rotating the gear-wheel 20. By this construction, as stated above, the piston 6 is always cushioned, while at the same time it always completes its stroke so that the air is compressed at both ends of the cylinder and this compressed air is forced out through the check valves in the outlets 13 and 14 into the pipe 15 to be conveyed by the flexible pipe 16 to the tank 17. The proper compression of the air is always insured as the piston 6 never stops moving in one direction until it has completed its complete stroke, so that there is no sudden movement of the piston in opposite directions where light jolts are received. I am therefore able to maintain a constant supply of compressed air in the cylinder or tank 17 which may be drawn off from time to time for whatever purpose it may be available in connection with the running of an automobile or other vehicle.

In Figs. 5 and 6 I have illustrated a modified form of my invention in which I employ a frictional gear for the ratchet of the above described mechanism, and this frictional gear comprises the frictional wheel 35 and the arms 36. In this case the arms 36 carry the pivotally mounted dog 38 which engages the face of the wheel 35, and the dog is permitted to move over the face of said wheel freely when the arm of said face is moved in one direction, but in the opposite direction the dog 38 grips the wheel 35 and moves it around in the same manner that the pawls move the ratchet wheel 22 above.

What I claim is:

1. In a device of the character described, the combination of a cylinder, a piston, a piston rod, a crank to which said piston is connected and means operated by the jolting of the vehicle for moving said crank always in the same direction whereby the stroke of the piston is completed before it reverses, a storage reservoir and connections between said cylinders and said storage reservoir.

2. In a device of the character described, the combination of a cylinder, a piston, a piston rod, a crank to which said piston is connected, a pinion in the crank shaft, a gear wheel engaged by said pinion, and means operated by the jolting of the vehicle to move said gear wheel in the same direction whereby said piston completes its stroke before reversing, a storage tank and connections between said cylinder and said storage tank.

3. In a device of the character described, the combination of a cylinder, a piston, a piston rod, a crank to which said piston rod is connected, a pinion on the crank shaft, a gear wheel engaged by said pinion, arms on the gear wheel shaft, means for moving said arms by the jolting of the vehicle, and means carried by said arms operating alternately to move said gear wheel in the same direction whereby the piston completes its stroke before reversing, a storage tank and connections between said cylinder and said storage tank.

4. In a device of the character described, the combination of a cylinder, a piston, a piston rod, a crank to which said piston rod is connected, a pinion on the crank shaft, a gear wheel engaged by said pinion, arms on the gear wheel shaft, reversely acting pawls carried by said arms, a ratchet connected to said gear wheel engaged by said pawls whereby by the movement of said arms the gear wheel 20 is moved in the same direction, and the piston completes its stroke before reversing, a storage tank, connections between said storage tank and said cylinder.

5. In a device of the character described, the combination of a cylinder, a piston, a piston rod, a crank to which said piston rod is connected, a pinion on the crank shaft, a gear wheel engaged by said pinion, arms on said gear wheel shaft, reversely mounted pawls carried by said arms, a ratchet connected to said gear wheel engaged by said pawls, lever arms connected to said arms, means for moving said lever arms by the jolting of the vehicle whereby said pawls turn the gear wheel 20 in the same direction, a storage tank and connections between said storage tank and said cylinder.

In testimony whereof, I the said JOSEPH D. JACKSON, have hereunto set my hand.

JOSEPH D. JACKSON.

Witnesses:
ROBERT C. TOTTEN,
JOHN F. WILL.